US009955360B2

(12) United States Patent
Bae et al.

(10) Patent No.: US 9,955,360 B2
(45) Date of Patent: Apr. 24, 2018

(54) RELAY APPARATUS, RECEIVING APPARATUS AND CONTROL METHOD THEREOF

(71) Applicant: SAMSUNG ELECTRONICS CO., LTD., Suwon-si (KR)

(72) Inventors: Jae-hyeon Bae, Seoul (KR); Hak-ju Lee, Seoul (KR); Jae-sung Han, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 496 days.

(21) Appl. No.: 14/136,961

(22) Filed: Dec. 20, 2013

(65) Prior Publication Data
US 2014/0355512 A1    Dec. 4, 2014

(30) Foreign Application Priority Data

Jun. 4, 2013   (KR) .................... 10-2013-0064058

(51) Int. Cl.
*H04W 16/26* (2009.01)
*H04B 7/155* (2006.01)

(52) U.S. Cl.
CPC ........ *H04W 16/26* (2013.01); *H04B 7/15528* (2013.01)

(58) Field of Classification Search
None
See application file for complete search history.

(56) References Cited

U.S. PATENT DOCUMENTS

| 8,023,445 B2 | 9/2011 | Jung et al. | |
| 8,630,580 B2* | 1/2014 | Sun | H04B 7/155 370/315 |
| 9,294,417 B2* | 3/2016 | Naden | H04B 7/15592 |
| 2001/0036233 A1* | 11/2001 | Laroia | H04L 1/08 375/286 |
| 2004/0057530 A1* | 3/2004 | Tarokh | H04L 1/0625 375/267 |
| 2004/0131041 A1* | 7/2004 | Tirkkonen | H04L 1/0625 370/349 |
| 2007/0183527 A1* | 8/2007 | Jia | H04B 7/0669 375/267 |
| 2008/0025248 A1 | 1/2008 | Naden | |
| 2008/0175184 A1 | 7/2008 | Chindapol et al. | |

(Continued)

FOREIGN PATENT DOCUMENTS

| KR | 100950659 B1 | 4/2010 |
| KR | 1020110035122 A | 4/2011 |

OTHER PUBLICATIONS

Written Opinion dated May 26, 2014 issued by the International Searching Authority in counterpart International Application No. PCT/KR2014/001221.

(Continued)

*Primary Examiner* — Chirag Shah
*Assistant Examiner* — Amar Persaud
(74) *Attorney, Agent, or Firm* — Sughrue Mion, PLLC

(57) ABSTRACT

A relay apparatus relays a signal received from a transmitting apparatus to a receiving apparatus, and includes a receiver configured to receive a signal from the transmitting apparatus, and a transmitter configured to repeatedly transmit a predetermined symbol interval of the received signal to the receiving apparatus.

7 Claims, 11 Drawing Sheets

(56) References Cited

U.S. PATENT DOCUMENTS

| | | | |
|---|---|---|---|
| 2009/0245195 A1* | 10/2009 | Bhattad | H04L 5/0053 370/329 |
| 2009/0325480 A1* | 12/2009 | Ji | H04B 7/022 455/8 |
| 2010/0166099 A1* | 7/2010 | Sari | H04L 1/0631 375/267 |
| 2011/0002244 A1 | 1/2011 | Wolfgang et al. | |
| 2011/0044295 A1 | 2/2011 | Li et al. | |
| 2011/0235736 A1* | 9/2011 | Hafeez | H04B 7/0669 375/267 |
| 2012/0028570 A1* | 2/2012 | Sun | H04B 7/155 455/9 |
| 2012/0189037 A1* | 7/2012 | Seo | H04B 7/026 375/213 |
| 2012/0300680 A1* | 11/2012 | Pietsch | H04B 7/15557 370/279 |
| 2013/0012119 A1* | 1/2013 | Ma | H04B 7/155 455/9 |

OTHER PUBLICATIONS

International Search Report dated May 26, 2014 issued by the International Searching Authority in counterpart International Application No. PCT/KR2014/001221.

* cited by examiner

FIG. 5

| Sym | S→R | | | | | R→D | | | |
|---|---|---|---|---|---|---|---|---|---|
| 0 | ● | $S_1$ | $S_2^*$ | ● | | ○ | $S_1$ | $S_2^*$ | ○ |
| 1 | ● | $S_2$ | $-S_1^*$ | ● | | ○ | $S_1$ | $S_2^*$ | ○ |
| 2 | ● | $S_3$ | $S_4^*$ | ● | | ○ | $S_3$ | $S_4^*$ | ○ |
| 3 | ● | $S_4$ | $-S_3^*$ | ● | | ○ | $S_3$ | $S_4^*$ | ○ |
| ⋮ | | ⋮ | | | | | ⋮ | | |

FIG. 8

$1 : r_1 = h_{SD}S_1 + h_{RD}S_1$
$2 : r_2 = h_{SD}S_2 + h_{RD}S_2$
$3 : r_3 = h_{SD}S_2 + h_{RD}S_1$
$4 : r_4 = h_{SD}S_1{}^* + h_{RD}S_2$ $$\begin{bmatrix} r_1 \\ r_2{}^* \\ r_3 \\ r_4{}^* \end{bmatrix} = \begin{bmatrix} h_{SD}+h_{RD} & 0 \\ 0 & (h_{SD}+h_{RD})^* \\ h_{RD} & h_{SD} \\ -h_{SD}{}^* & h_{RD}{}^* \end{bmatrix} \begin{bmatrix} S_1 \\ S_2 \end{bmatrix}$$

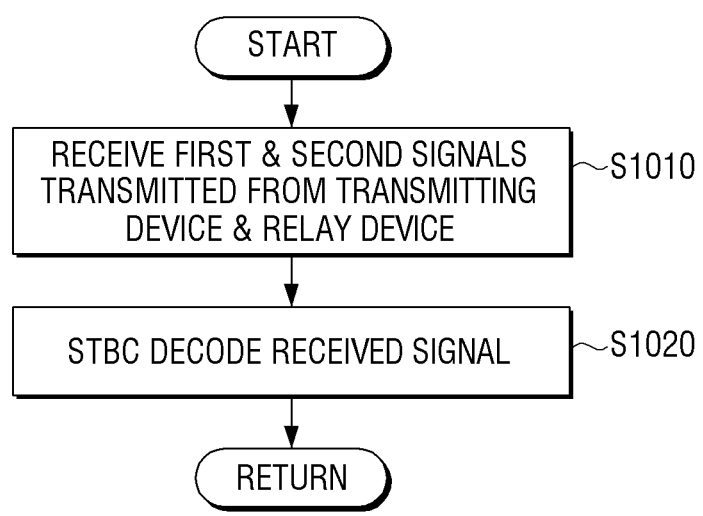

RELAY APPARATUS, RECEIVING APPARATUS AND CONTROL METHOD THEREOF

CROSS-REFERENCE TO RELATED APPLICATION

This application claims priority from Korean Patent Application No. 10-2013-0064058, filed on Jun. 4, 2013, in the Korean Intellectual Property Office, the disclosure of which is incorporated herein by reference in its entirety.

BACKGROUND

1. Field

Apparatuses and methods consistent with what is disclosed herein relate to a relay apparatus, a receiving apparatus and a control method thereof, and more particularly, to a relay apparatus configured to relay a signal received from a transmitting apparatus to a receiving apparatus, a receiving apparatus and a control method thereof.

2. Description of the Related Art

The recent increased demands for various multimedia information of wireless communication systems increased demands for high speed data communication. To meet the demands from the market, the International Mobile Telecommunication (IMT)-Advanced has set the target of improving the current performance of mobile phone systems to 1 Gbps downstream link, and 500 Mbps uplink. The main techniques including Multi Input Multi Output (MIMO), Cognitive Radio (CR) or Coordinated Multi-point (CoMP) are currently researched to achieve the target of improved mobile phone system performance.

The spatial time coding is the efficient technique to reduce degradation of performance of a wireless communication system due to fading. Alamouti suggested a spatial time coding method that can have diversity gains using two transmitting end antennas and a single receiving end antenna. The spatial time coding can maximize the efficiency by being used with an orthogonal frequency-division multiplexing (OFDM) technique, because it does not take selectivity into consideration. Meanwhile, while the spatial time coding using multi-antennas can improve the stability of the communication link and receptivity, there are difficulties associated with need for use of multi-antennas such as power and antenna size problems. Due to the difficulty of establishing a terminal using multi-antennas, the cooperative spatial time coding system using terminals or relays has gained increasing attention. The cooperative wireless communication system has the characteristic of diversity gains through the spatial time coding between a source node and relay node which include a single antenna.

Meanwhile, in a related method that delays a signal at a relay node by the unit of a specific symbol interval and transmits the signal to a receiving node, a simple method of linear amplification and re-transmission is employed. As a result, complexity is low and delay is not included, and the relay node delays the signal by the unit of 1 block to cause the receiving node to have a spatial time block code (STBC) signal, so that the desired symbol is found at blocks in front and back using the STBC signal to obtain diversity gains through the maximal ratio combining (MRC).

However, since accurate symbol estimation is difficult when fading occurs, the method of estimating symbols at the blocks in front and back using inaccurate symbols can cause a problem such as error propagation. Further, full diversity gain is hardly obtained when the receiver estimates symbols, and overhead increases since the relay node separately requires additional subcarriers to distinguish pilots.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to one exemplary embodiment, a technical objective is to provide a relay apparatus, a receiving apparatus and a control method thereof with which a relay system obtains STBC gains and design frame structure that is robust to fading environment.

In one exemplary embodiment, a relay apparatus is provided to relay a signal received from a transmitting apparatus to a receiving apparatus, which may include a receiver configured to receive a signal from the transmitting apparatus, and a transmitter configured to repeatedly transmit a predetermined symbol interval of the received signal to the receiving apparatus.

The transmitter may transmit to the receiving apparatus, two successive symbols included in a (k)th symbol interval of a symbol interval that includes two successive symbols of the received signal, in a (k+1)th symbol interval, k being a natural number.

The relay apparatus may additionally include a pilot remover configured to remove a pilot symbol from the received signal. The transmitter may repeatedly transmit the received signal, from which the pilot symbol is removed, to the receiving apparatus.

In one exemplary embodiment, a receiving apparatus is provided to receive signals respectively transmitted from a transmitting apparatus and a relay apparatus, which may include a receiver configured to receive a first signal and a second signal respectively transmitted from the transmitting apparatus and the relay apparatus, and a decoder configured to spatial time block code (STBC) decode the received signal. The second signal may be in a form in which a predetermined symbol interval of the first signal repeats.

The second signal may be in a form in which two symbols, which are included in a (k)th symbol interval of a symbol interval that includes two successive symbols of the first signal, are repeated in a (k+1)th symbol interval, k being a natural number.

The decoder may perform the STBC decoding using two symbols, which are included in the (k+1)th symbol interval of the symbol interval that includes two successive symbols of the first signal, and another two symbols, which are included in the (k+1)th symbol interval of the symbol interval that includes two successive symbols of the second signal.

The first signal may include a pilot symbol, and the second signal is a signal from which the pilot symbol is removed.

The receiving apparatus may additionally include a channel estimator configured to estimate a channel between the relay apparatus and the receiving apparatus, using the first signal, the second signal and a pilot signal detected from the first signal.

In one exemplary embodiment, a control method of a relay apparatus to relay a signal received from a transmitting apparatus to a receiving apparatus, is provided, which may include receiving a signal from the transmitting apparatus, and transmitting, repeatedly, a predetermined symbol interval of the received signal to the receiving apparatus.

The transmitting comprises repeatedly transmitting to the receiving apparatus, two successive symbols included in a (k)th symbol interval of a symbol interval that includes two successive symbols of the received signal, in a (k+1)th symbol interval, k being a natural number.

The control method may additionally include removing a pilot symbol from the received signal. The transmitting may include repeatedly transmitting the signal excluding the pilot symbol to the receiving apparatus.

In one exemplary embodiment, a control method of a receiving apparatus to receive signals respectively transmitted from a transmitting apparatus and a relay apparatus, is provided, which may include receiving a first signal and a second signal transmitted respectively from the transmitting apparatus and the relay apparatus, and spatial time block code (STBC) decoding the received signal. The second signal may be in a form in which a predetermined symbol interval of the first signal repeats.

The second signal may be in such a form that two symbols, which are included in a (k)th symbol interval of a symbol interval that includes two successive symbols of the first signal, are repeated in a (k+1)th symbol interval, k being a natural number.

The STBC decoding may include performing the STBC decoding using two symbols, which are included in the (k+1)th symbol interval of the symbol interval that includes two successive symbols of the first signal, and another two symbols, which are included in the (k+1)th symbol intervals of the symbol interval that includes two successive symbols of the second signal.

The first signal may include a pilot symbol, and the second signal is a signal from which the pilot symbol is removed.

The control method may additionally include estimating a channel between the relay apparatus and the receiving apparatus, using the first signal, the second signal and the pilot signal detected from the first signal.

The receiving apparatus may distinguish the first signal from the second signal based on inclusion or exclusion of the pilot symbol.

The receiving apparatus may distinguish the signal received from the relay apparatus from another signal received from the transmitting apparatus based on an inclusion or exclusion of the pilot symbol.

According to various exemplary embodiments, a frame structure is provided, which can obtain STBC gains in a relay system and which is also robust to fading environment.

BRIEF DESCRIPTION OF THE DRAWINGS

The above and/or other aspects of the present inventive concept will be more apparent by describing certain exemplary embodiments of the present inventive concept with reference to the accompanying drawings, in which:

FIG. 5 is a view provided to explain a signal form for transmission, according to an exemplary embodiment;

FIG. 8 is a view provided to explain a channel estimation method according to an exemplary embodiment;

FIG. 10 is a flowchart provided to explain a control method of a receiving apparatus according to an exemplary embodiment.

DETAILED DESCRIPTION OF EXEMPLARY EMBODIMENTS

Figure 1:
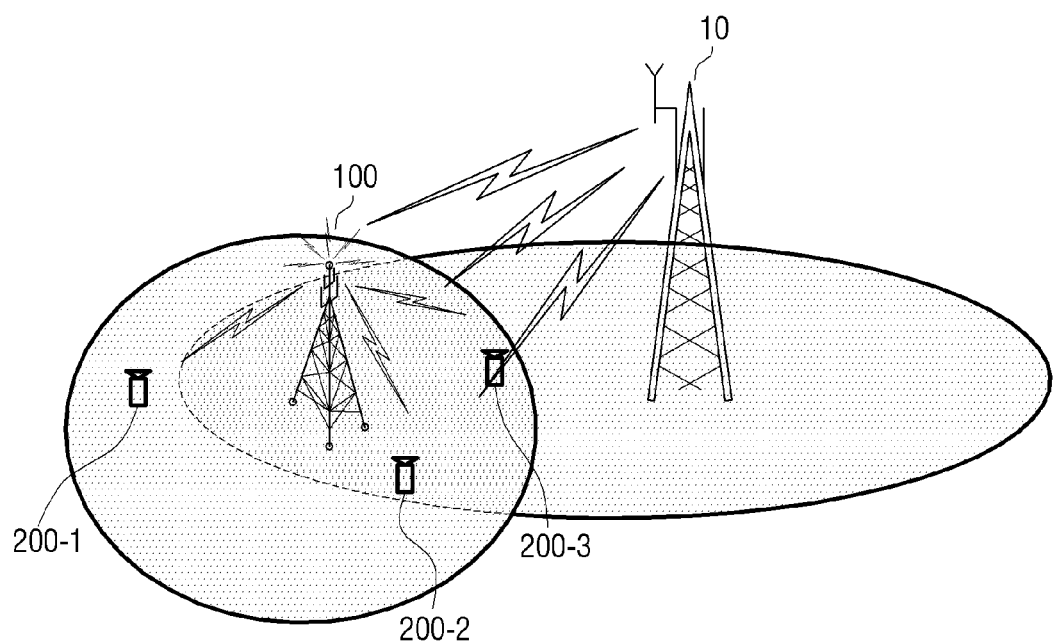
FIG. 1 is a block diagram of a communication system according to an exemplary embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

FIG. 1 is a block diagram of a communication system according to an exemplary embodiment.

Referring to FIG. 1, the communication system includes a transmitting apparatus 10, a relay apparatus 100 and receiving apparatuses 200-1, 200-2, 200-3.

The communication system may be implemented as a wireless communication system, and the transmitting apparatus 10 may be implemented as a base station apparatus, and the receiving apparatuses 200-1, 200-2, 200-3 may be implemented as mobile terminals.

To be specific, the communication system may be implemented as a cooperative spatial time coding system which has a characteristic of obtaining diversity gains through spatial time coding between a source node 10 having a single antenna (i.e., a transmitting apparatus) and a relay node (i.e., relay apparatus) 100. The communication system is adopted in the specification including LTE-A and IEEE 802.16m and 802.18j.

To be specific, the communication system according to an exemplary embodiment may adopt spatial time coding (STC) technology. STC codes the same data to a plurality of transmitting antennas to improve reliability of the transmission data. Because the same signal is coded and transmitted to the transmitting antennas, the signal to noise (S/N) ratio due to transmission diversity improves, and the data reliability improves. Depending on how the signal is coded, two types of STC can be implemented, which are, the space time trellis code that uses lattice code, and the space time block code that uses block code. In one exemplary embodiment, it is assumed that the STBC is used.

The exemplary embodiment can particularly implement the orthogonal frequency division multiplexing which is one of the multi-carrier transmissions using multiple carriers. The OFDM has a transmission period at the respective channel which is increased as much as the number of carriers. Since the frequency selective channel appearing in the wide band transmission is approximated to a frequency non-selective channel which is free of inter-symbol interferences, compensation is possible by a simple, single tap equalizer.

The transmitting apparatus 10 converts the data to be transmitted into symbol form (e.g., OFDM symbol) and transmits the same to the relay apparatus 100 and the receiving apparatuses 200-1, 200-2, 200-3. That is, the transmitting apparatus 10 transmits the data to be transmitted to the receiving apparatus 200-1, 200-2, 200-3 to the relay apparatus 100 and the receiving apparatuses 200-1, 200-2, 200-3.

The relay apparatus 100 amplifies the signal receiving from the transmitting apparatus 10 and transmits the resultant signal to the receiving apparatuses 200-1, 200-2, 200-3. The relay apparatus 100 particularly repeats the signal received from the transmitting apparatus 10 and transmits the same to the receiving apparatuses 200-1, 200-2, 200-3 which will be explained in detail below.

The receiving apparatus 200 receives a signal transmitted from the transmitting apparatus 100 and a signal transmitted from the relay apparatus 100 and decodes the received signals. The receiving apparatus 200 may have a decoder to decode the received signal which will be explained in detail below.

Figure 2:
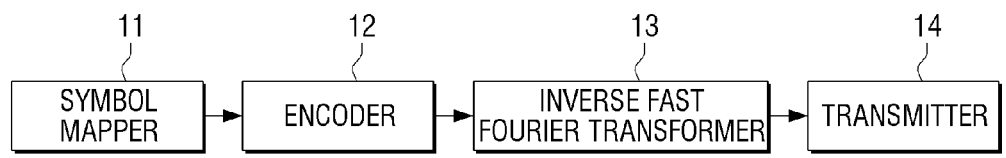
FIG. 2 is a block diagram of a transmitting apparatus according to an exemplary embodiment.

FIG. 2 is a block diagram of a transmitting apparatus according to an exemplary embodiment.

Referring to FIG. 2, the transmitting apparatus according to an exemplary embodiment includes a symbol mapper 11, an encoder 12, an inverse fast Fourier transformer 13, and a transmitter 14.

The symbol mapper 11 modulates an incoming signal (or data). That is, the symbol mapper 110 may perform QPSK/QAM modulation, using modulation such as 8PSK, 16QAM, 64QAM, QPSK. Each of the modulation methods may be performed by their unique symbol mapping methods.

The encoder 12 performs spatial time coding of the output from the symbol mapper 11. To be specific, the encoder 12 performs spatial time block coding (STBC) with respect to the output from the modulator 110. The STBC, which is the coding method defined in the 3GPP WCDMA-based IMT-2000 wireless interface specification, has the advantage of obtaining diversity gains that can reduce multi-path fading influence, without requiring additional bandwidths in a multi-antenna system.

The inverse fast Fourier transformer 13 converts the frequency-domain signal into time-domain OFDM signal, by performing inverse fast Fourier transform (IFFT) on the output from the encoder 12.

The transmitter 14 transmits the converted signal from the IFFT 13. The transmitter 14 may be implemented as an antenna.

Meanwhile, although not illustrated in the drawings, the transmitting apparatus according to an exemplary embodiment may additionally include a pilot inserter (not illustrated) to insert a guard interval (GI), a G.I block (not illustrated), and a P/S block (not illustrated) to convert the time-domain OFDM signal into serial form and output the same. For example, the G.I block (not illustrated) may insert the guard interval with respect to the respective OFDM symbols outputted from the IFFT 13.

Figure 3A:
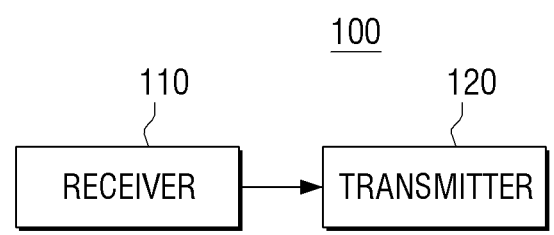
FIGS. 3A and 3B are block diagrams of a relay apparatus according to various exemplary embodiments.
Figure 3B:
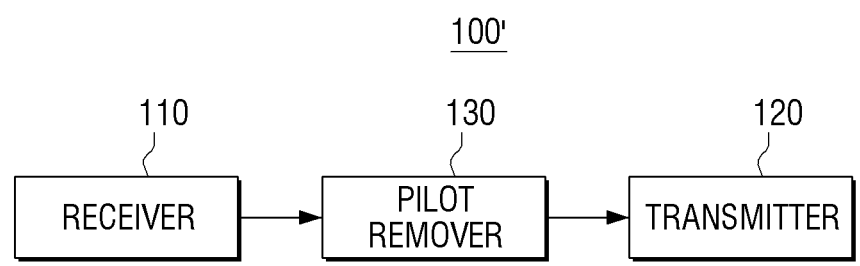

FIGS. 3A and 3B are block diagrams of a relay apparatus according to various exemplary embodiments.

FIG. 3A is a block diagram of a relay apparatus according to an exemplary embodiment.

Referring to FIG. 3A, the relay apparatus 100 includes a receiver 110 and a transmitter 120.

The relay apparatus 100 relays a signal received from the transmitting apparatus 10 (FIG. 1) to the receiving apparatus 200 (FIG. 1).

The receiver 110 receives a signal from the transmitting apparatus 10. For example, the receiver 110 may be implemented as a receiving antenna.

The transmitter 120 repeatedly transmits a specific symbol interval of the signal received from the transmitting apparatus 10, to the receiving apparatus 200. For example, the transmitter 110 may be implemented as a transmitting antenna. The 'specific symbol interval' may be FEC code length, but is not limited thereto.

To be specific, the signal received via the receiver 100 may be stored in a specific buffer space, and the transmitter 120 may repeatedly transmit a predetermined symbol interval to the receiving apparatus 200 using the stored signal.

In one exemplary embodiment, the transmitter 120 may transmit two successive symbols of the received signal to the receiving apparatus 200. To be specific, the transmitter 120 may transmit two symbols received in the (k)th symbol interval of the symbol intervals that includes two successive symbols of the transmitted signal, and repeatedly transmit the two transmitted symbols in the next symbol interval, i.e., in the (k+1)th symbol interval.

For example, when the received signal includes two successive symbols (S1, S2*) received in the odd-numbered symbol interval, the signal containing S1, S2* may be transmitted to the receiving apparatus 200 in the odd-numbered symbol interval, and the same signal, i.e., the signal containing S1, S2* may then be repeatedly transmitted to the receiving apparatus 200 in the even-numbered symbol interval. The asterisk (*) denotes a conjugate signal. Accordingly, it is possible to obtain full diversity gain.

Referring to FIG. 3B, the relay apparatus 100' includes a receiver 110, a transmitter 120 and a pilot remover 130.

The receiver 110 and the transmitter 120 have the same functions as explained above with reference to FIG. 3A, and thus will not be further explained below for the sake of brevity.

The pilot remover 130 removes a pilot symbol from the received signal.

The transmitter 120 may transmit the signal from which pilot symbol is removed, to the receiving apparatus 200.

Accordingly, the receiving apparatus 200 may distinguish the signal received from the transmitting apparatus 10 from the signal received from the relay apparatus 100. As a result, overhead is reduced.

Figure 4A:
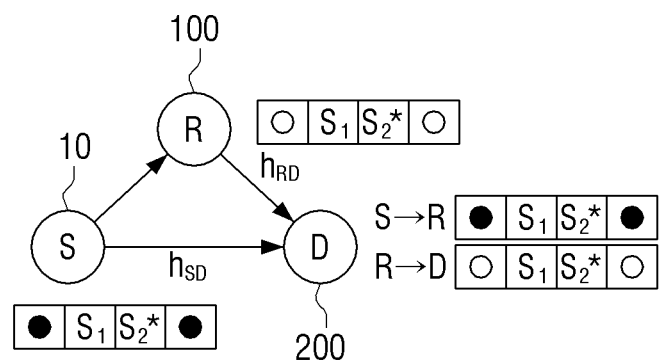
FIGS. 4A and 4B are views provided to explain a signal transmitting method according to an exemplary embodiment.
Figure 4B:
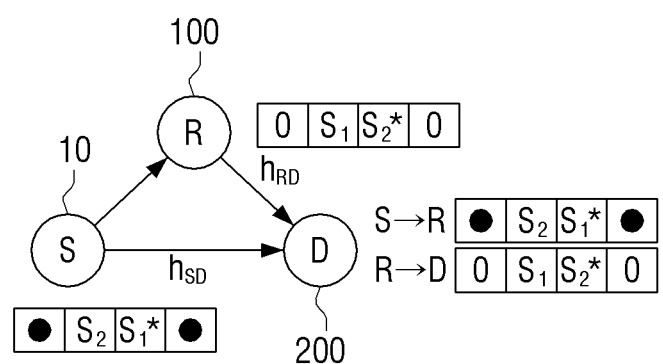

FIGS. 4A and 4B are views provided to explain a signal transmission method according to an exemplary embodiment.

FIG. 4A illustrates a signal format that is transmitted in the odd-numbered symbol interval, according to an exemplary embodiment.

Referring to FIG. 4A, the transmitting apparatus 10 transmits a signal containing S1, S2* to the relay apparatus 100 and the receiving apparatus 200, and the relay apparatus 100 transmits to the receiving apparatus 200 the signal form from which the pilot signal is removed.

Accordingly, the receiving apparatus 200 receives the S1, S2* symbol interval signals transmitted from the transmitting apparatus 10 and the S1, S2* symbol interval signal without the pilot signal, transmitted from the relay apparatus 100.

FIG. 4B illustrates a signal format that is transmitted in the even-numbered symbol interval, according to an exemplary embodiment.

Referring to FIG. 4B, while the signal containing S2, −S1* is transmitted from the transmitting apparatus 10 to the relay apparatus 100 and the receiving apparatus 200, the relay apparatus 100 repeatedly transits S1, S2* signal which is transmitted in the previous odd-numbered symbol interval to the receiving apparatus 200.

Accordingly, the receiving apparatus 200 receives S2, −S1* symbol interval signal transmitted from the transmitting apparatus 10 and S1, S2* symbol interval signal free of the pilot signal transmitted from the relay apparatus 100.

FIG. 5 is a view provided to explain a form of a transmitted signal, according to an exemplary embodiment.

In the first symbol interval, the transmitting apparatus 10 transmits S1, S2* signals to the relay apparatus 100 and the receiving apparatus 200, and the relay apparatus 100 transmits the identical S1, S2* signals to the receiving apparatus 200. In this case, the signal transmitted from the transmitting apparatus 10 to the relay apparatus 100 and the receiving apparatus 200 contain a pilot symbol, while the signal transmitted from the relay apparatus 100 to the receiving apparatus 200 is free of the pilot symbol.

Next, in the second symbol interval, the transmitting apparatus 10 transmits S2, −S1* signals to the relay apparatus 100 and the receiving apparatus 200, and the relay apparatus 100 repeatedly transmits S1, S2* signals transmitted in the first symbol interval to the receiving apparatus 200. In this case, the signal transmitted from the transmitting apparatus 10 to the relay apparatus 100 and the receiving apparatus 200 includes a pilot symbol, while the signal transmitted from the relay apparatus 100 to the receiving apparatus 200 does not include a pilot symbol.

Subsequently, in the third symbol interval, the transmitting apparatus 10 transmits S3, S4* signals to the relay apparatus 100 and the receiving apparatus 200, and the relay apparatus 100 transmits the identical S3, S4* signals to the receiving apparatus 200. In this case, the signal transmitted from the transmitting apparatus 10 to the relay apparatus 100 and the receiving apparatus 200 includes a pilot symbol, while the signal transmitted from the relay apparatus 100 to the receiving apparatus 200 does not include a pilot symbol.

Next, in the fourth symbol interval, the transmitting apparatus 10 transmits S4, −S3* signals to the relay apparatus 100 and the receiving apparatus 200, and the relay apparatus 100 repeatedly transmits S3, S4* signals transmitted in the third symbol interval to the receiving apparatus 200. As a result, full diversity gains are obtained. In this case, the signal transmitted from the transmitting apparatus 10 to the relay apparatus 100 and the receiving apparatus 200 includes a pilot symbol, while the signal transmitted from the relay apparatus 100 to the receiving apparatus 200 does not include a pilot symbol.

FIG. 6 is a block diagram of a receiving apparatus according to an exemplary embodiment.

Figure 6A:
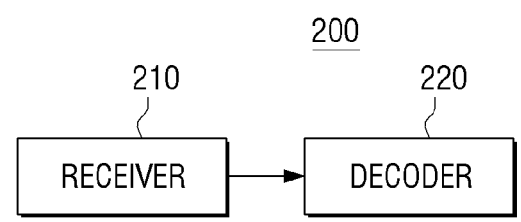
FIGS. 6A and 6B are block diagrams of a receiving apparatus according to an exemplary embodiment.

Referring to FIG. 6A, the receiving apparatus 200 includes a receiver 210 and a decoder 220.

The receiver 210 receives signals transmitted from the transmitting apparatus and the relay apparatus 100, respectively. The receiver 210 may be implemented as, for example, a receiving antenna.

To be specific, the receiver 210 may receive a first signal transmitted from the transmitting apparatus 10 and a second signal with a repeated predetermined symbol interval of the first signal, which is transmitted from the relay apparatus 100. The second signal received from the relay apparatus 100 may particularly take a form in which two symbols included in (k)th symbol interval (e.g., odd-numbered symbol interval) repeat in the symbol interval that includes the two successive symbols of the first signal received from the transmitting apparatus 10.

The decoder 220 performs spatial time decoding with respect to the received signal. To be specific, the decoder 220 may perform spatial time block decoding.

That is, the decoder 220 may perform STBC decoding using two symbols included in the even-numbered symbol intervals of the symbol interval that includes two successive symbols of the first signal, and two symbols included in even-numbered symbol interval of the symbol interval that includes two successive symbols of the second signal.

Meanwhile, it is possible to estimate the channel between the transmitting and receiving apparatuses 10, 200 based on the pilot symbols of the signal received from the transmitting apparatus 10 in the odd-numbered symbol interval. The estimated channel information may be used at the decoder 220 for STBC symbol estimation of the even-numbered symbol interval.

That is, the error propagation is prevented, because (k)th channel estimation information is utilized only for the purpose of (k+1)th STBC symbol estimation.

Figure 6B:
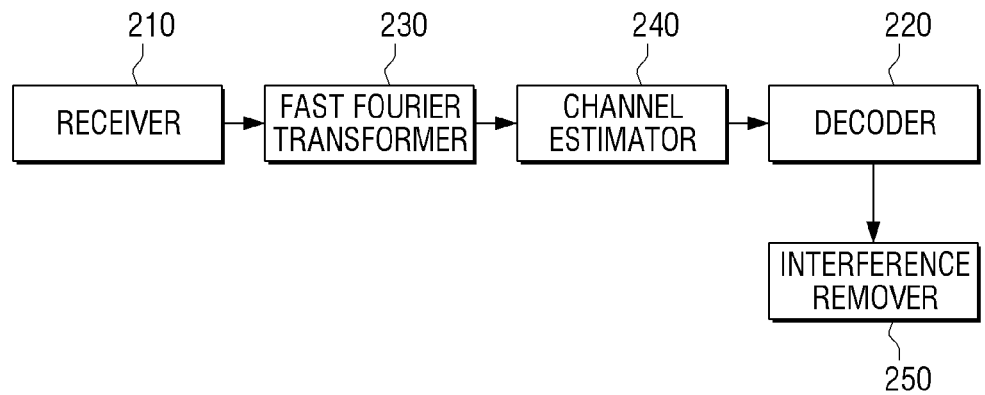

Referring to FIG. 6B, the receiving apparatus 200 includes a receiver 210, a decoder 220, a fast Fourier transformer 230, a channel estimator 240, an interference remover 250, a symbol mapper, a deinterleaver and a FEC decoder.

The receiver 210 receives signals respectively transmitted from the transmitting apparatus 10 and the relay apparatus 100.

That is, the receiver 210 may receive the first signal transmitted from the transmitting apparatus 10, and a second signal with predetermined, repeating symbol interval of the first signal transmitted from the relay apparatus 100. To be specific, the second signal received from the relay apparatus 100 may be in such a form that the two symbols included in the (k)th symbol interval (e.g., odd-numbered symbol interval) repeat in the symbol interval that includes two successive symbols of the first signal transmitted from the transmitting apparatus 10.

Further, the second signal transmitted from the relay apparatus 100 may be in such a form that pilot symbols are removed. Accordingly, the receiving apparatus 200 may distinguish the first signal that includes the pilot symbol transmitted from the transmitting apparatus 10, from the second signal from which the pilot symbols are removed and which are transmitted from the relay apparatus 100.

The fast Fourier transformer 230 performs FFT with respect to the received signal.

The channel estimator 240 estimates channels between the transmitting apparatus 10 and the receiving apparatus 200, and a channel between the relay apparatus 100 and the receiving apparatus 200, to thereby estimate respective channel frequency responses.

That is, the channel estimator 240 may estimate the channel between the transmitting apparatus 10 and the receiving apparatus 200 using the pilot symbol included in the first signal transmitted from the transmitting apparatus 10. The channel estimator 240 can estimate channel information between the transmitting apparatus 10 and the receiving apparatus 200 using the signal received in the (k)th symbol interval, and the estimated channel information can be used for STBC block symbol estimation in the (k+1)th symbol interval.

Further, the channel estimator 240 may estimate the channel status between the relay apparatus and the receiving apparatus, using the first signal transmitted from the transmitting apparatus 10, the second signal transmitted from the relay apparatus 100, and the pilot symbol detected from the first signal.

That is, the channel estimator 240 detects the data symbol (digital symbol) and also the pilot symbol with known size and phase, and estimate (i.e., channel estimate) the channel status using the detected pilot symbol and use it for the equalization of the size and phase of the data symbol.

However, when the second signal does not include the pilot symbol, it is not possible to estimate the channel between the relay apparatus 100 and the receiving apparatus 200. In this case, the channel estimator 240 may estimate the channel between the relay apparatus 100 and the receiving apparatus 200, based on the channel information between the transmitting apparatus 10 and the receiving apparatus 200, which is estimated using the pilot symbol detected from the first signal, and the first and second signal.

The decoder 220 performs spatial time decoding with respect to the received signal. The decoder 220 may particularly perform spatial time block decoding.

To be specific, the decoder 220 may perform STBC decoding using two symbols included in the even-numbered symbol interval of the symbol interval that includes two successive symbols of the first signal received from the transmitting apparatus 10, and two symbols included in the even-numbered symbol interval of the symbol interval that includes two successive symbols of the second signal. To be specific, the decoder 220 may perform STBC decoding using the channel information between the transmitting apparatus 10 and the receiving apparatus 200 estimated in the odd-numbered symbol interval.

The decoder 220 performs linear combining to perform STBC decoding and decodes using simple maximum likelihood (Ml) manner. If it is assumed that there is no channel change between the two temporally successive OFDM symbols, it is possible to apply the STBC to OFDM method. Meanwhile, if the time variation of the channel is large enough to cause the channel between successive OFDM symbols to change, it is difficult to apply the STBC-OFDM. However, encoding can be implemented between symbols of adjacent sub channels, when the frequency selectivity of the channel is not very large and the FFT size is large so that the channel frequency response between adjacent sub-channels does not vary. It is therefore possible to implement SFBC-OFDM because encoding is performed in the frequency domain.

Meanwhile, the received signal that has been spatial time decoded has an auto interference signal that has to be removed.

Accordingly, the interference remover 250 removes the interferences by the repetitive auto interference removal process. The repetitive auto interference removal process includes symbol de-mapping the spatial time decoded received signal at a symbol demapper (not illustrated), deinterleaving the symbol-demapped received signal at a deinterleaver (not illustrated), and FEC decoding the deinterleaved signal at a FEC decoder (not illustrated) in sequential order. The resultant signal will be referred to as the 'first removal signal'. The first removal signal may be used as is, depending on needs. Considering that the possibility of removing auto interferences increases as the number of repeating the removal process increases, it is preferable to perform the repetitive process as many times as possible.

Figure 7:
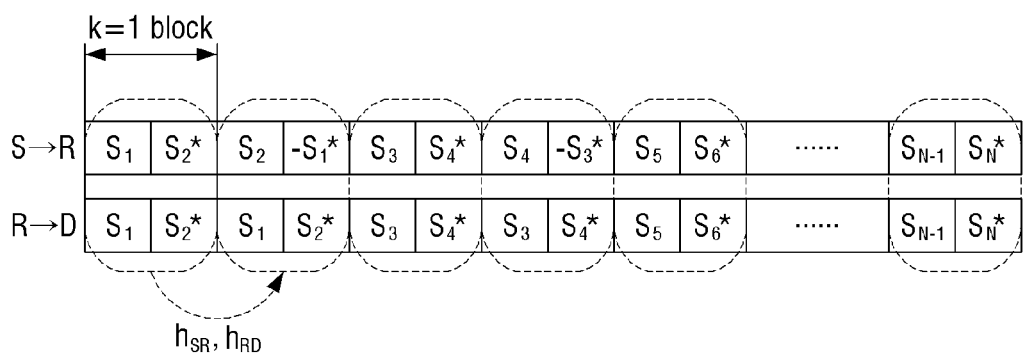
FIG. 7 illustrates a signal form received at a receiving apparatus according to an exemplary embodiment.

FIG. 7 illustrates a form of a signal received at a receiving apparatus, according to an exemplary embodiment.

Referring to FIG. 7, S1, S2* signals are transmitted from the transmitting apparatus 10 to the relay apparatus 100 and the receiving apparatus 200 in the first symbol interval (or first block interval). The relay apparatus 100 in receipt of the S1, S2* signals transmitted from the transmitting apparatus 10 amplifies the corresponding signals and transmits the resultant signals to the receiving apparatus 200. Accordingly, the receiving apparatus 200 receives S1, S2* signals transmitted from the transmitting apparatus 10, and S1, S2* signals transmitted from the relay apparatus 10. In this case, the signal transmitted from the transmitting apparatus 10 to the receiving apparatus 200 includes pilot symbol, so that the receiving apparatus 100 can estimate channel between the transmitting apparatus 10 and the receiving apparatus 200 using the pilot symbol as received in the first symbol interval.

Next, S1, S2* signals are transmitted in the second symbol interval (or second block interval) from the transmitting apparatus 10 to the relay apparatus 100 and the receiving apparatus 200, and the relay apparatus 100 repeatedly transmits the signal transmitted in the first symbol interval (or first block interval) to the receiving apparatus 200, to the receiving apparatus 200. As a result, the receiving apparatus 200 receives S2, −S1* signals transmitted from the transmitting apparatus 10, and S1, S2* signals transmitted from the relay apparatus 100. In this case, the receiving apparatus 200 can perform STBC decoding using the S2, −S1* signals and the S1, S2* signals received in the second symbol interval. That is, the receiving apparatus 200 can obtain diversity gains by performing STBC decoding using the signals received in every even-numbered symbol interval.

In the above case, the channel information estimated in the first symbol interval may be used for the STBC decoding. That is, in one exemplary embodiment, the error propagation can be prevented by using the (k)th channel estimation information only for the (k+1)th STBC symbol estimation.

FIG. 8 is a view provided to explain a channel estimation method according to an exemplary embodiment.

Referring to FIG. 8, signals (r1, r2, r3, r4 . . . ) are received at the receiving apparatus 200, in which case r1=hSDS1+hRDS1, r2=hSDS2+hRDS2, r3=hSDS2+hRDS1, r4=−hSDS1*+hRDS2. 'hSD' can be calculated from the pilot symbol included in the signal that is received from the transmitting apparatus 10 to the receiving apparatus 200.

Accordingly, the receiving apparatus 200, which knows r1, r2, r3, r4 and, hSD, can calculate hRD based on the mathematical formula, and also calculate S1, S2.

Meanwhile, the r* conjugate form of the received signal, and hSD and hRD denote channel frequency responses between the transmitting apparatus 10 and the receiving apparatus 200, and between the relay apparatus 100 and the receiving apparatus 200.

Figure 9:
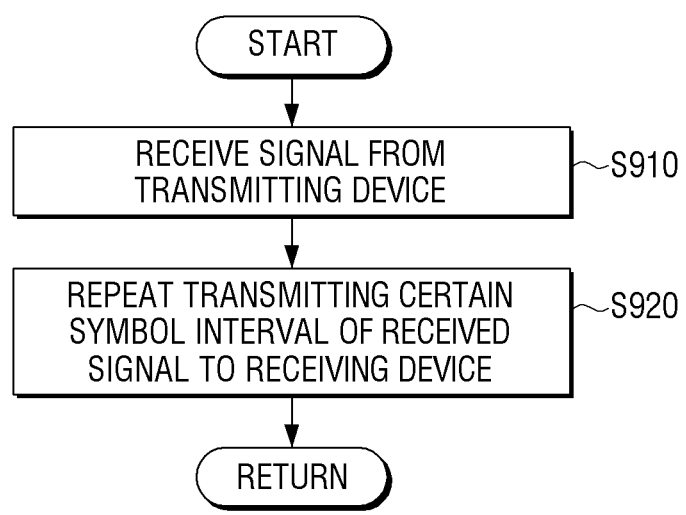
FIG. 9 is a flowchart provided to explain a control method of a relay apparatus according to an exemplary embodiment.

FIG. 9 is a flowchart provided to explain a control method of a relay apparatus, according to an exemplary embodiment.

Referring to FIG. 9, a control method of a relay apparatus for relaying the signal received from the transmitting apparatus to the receiving apparatus includes, first, receiving a signal from the transmitting apparatus (S910).

At S920, a predetermined symbol interval of the received signal is then repeatedly transmitted to the receiving apparatus.

To be specific, at S920, two successive symbols included in (k)th symbol interval of the symbol interval that includes two successive symbols of the received signal may be repeatedly transmitted in the (k+1)th symbol interval to the receiving apparatus.

In the above case, the pilot symbol is removed from the received signal, so that the signal free of the pilot symbol can be repeatedly transmitted to the receiving apparatus.

FIG. 10 is a flowchart provided to explain a control method of a receiving apparatus, according to an exemplary embodiment.

Referring to FIG. 10, a control method of the receiving apparatus includes, first, receiving a first signal and a second signal respectively transmitted from the transmitting apparatus and the relay apparatus, at S1010.

At S1020, the received signals are then spatial-time block code (STBC) decoded. The second signal may be implemented in such a form in which a predetermined symbol interval of the first signal repeats.

To be specific, the second signal may be in such a form that two symbols, which are included in the (k)th symbol interval of the symbol interval that includes two successive symbols of the first signal, are repeated in the (k+1)th symbol interval.

In the above case, at S1020, the STBC decoding may be performed using the two symbols included in the (k+1)th symbol interval of the symbol interval that includes two successive symbols of the first signal, and two symbols included in the (k+1)th symbol interval of the symbol interval that includes two successive symbols of the second signal.

In the above case, the first signal includes a pilot symbol, and the second signal may be the one that has the pilot symbol removed.

Further, it is possible to estimate a channel between the relay apparatus and the receiving apparatus, using the first signal, the second signal, and the pilot symbol detected from the first signal.

As explained above, in various exemplary embodiments, a frame structure is provided, which can obtain STBC gains in a relay system and which is also robust in a fading environment.

Meanwhile, the control method of the display apparatus according to various exemplary embodiments are implementable as a computer-executable program code which can be recorded in a non-transitory computer readable medium and provided to the relay apparatus and the receiving apparatus to be executed by the processor.

For example, a non-transitory computer readable medium may be provided, which stores therein a program that receives a signal from a transmitting apparatus, and repeatedly transmits a predetermined symbol interval of the received signal to a receiving apparatus.

The 'non-transitory computer readable recording medium' refers to a medium which stores data semi-permanently and can be read by devices, not a medium storing data temporarily such as a register, cache, or memory. Specifically, the above various applications or programs may be stored and provided in a non-transitory computer readable recording medium such as a compact disc (CD), digital versatile disc (DVD), hard disk, Blu-ray disk, universal serial bus (USB), memory card, or read-only memory (ROM).

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. A relay apparatus for relaying a signal received from a transmitting apparatus to a receiving apparatus, the relay apparatus comprising:
   a receiver configured to receive a first signal from the transmitting apparatus; and
   a transmitter configured to transmit the first signal from which a pilot symbol has been removed, to the receiving apparatus,
   wherein the received first signal comprises two successive symbols,
   wherein the transmitter is configured to:
   transmit, in a first data interval, the two successive symbols to the receiving apparatus, and
   transmit, in a second data interval, the two successive symbols to the receiving apparatus,
   wherein the first signal from which the pilot symbol has been removed, a second signal and a pilot signal obtained from the second signal are used in a channel estimation at the receiving apparatus, and
   wherein the second signal is transmitted from the transmitting apparatus to the receiving apparatus,
   wherein two symbols received from the relay apparatus in the second data interval and two symbols received from the transmitting apparatus in the second data interval are used in spatial time block code (STBC) decoding at the receiving apparatus.

2. A receiving apparatus comprising:
   a receiver configured to receive a first signal and a second signal from a transmitting apparatus and a relay apparatus, respectively; and
   a decoder configured to preform spatial time block code (STBC) decoding using the received first and second signals, wherein the first signal comprises two successive symbols,
   wherein the second signal comprises the two successive symbols in a first data interval and comprises the two successive symbols in a second data interval,
   wherein the first signal comprises a pilot symbol and the second signal is a signal from which the pilot symbol has been removed,
   wherein the first signal received from the transmitting apparatus, the second signal received from the relay apparatus and a pilot signal obtained from the first signal are used in a channel estimation at the receiving apparatus, and
   wherein the decoder performs the STBC decoding using two symbols received from the transmitting apparatus in the second data interval, and two symbols received from the relay apparatus in the second data interval.

3. The receiving apparatus of claim 2, wherein the receiving apparatus identifies the first signal and the second signal based on inclusion or exclusion of the pilot symbol.

4. A control method of a relay apparatus which relays a signal received from a transmitting apparatus to a receiving apparatus, the control method comprising:
   receiving a first signal from the transmitting apparatus;
   removing a pilot symbol from the received first signal; and
   transmitting the first signal from which the pilot symbol has been removed, to the receiving apparatus,
   wherein the received first signal comprises two successive symbols wherein the transmitting comprises transmitting, in a first data interval, the two successive symbols to the receiving apparatus and transmitting, in a second data interval, the two successive symbols to the receiving apparatus, wherein the first signal from which the pilot symbol has been removed, a second signal and a pilot signal obtained from the second signal are used in a channel estimation at the receiving apparatus, and wherein the second signal is transmitted from the transmitting apparatus to the receiving apparatus, wherein two symbols received from the relay apparatus in the second data interval and two symbols received from the transmitting apparatus in the second data interval are used in spatial time block code (STBC) decoding at the receiving apparatus.

5. The control method of claim 4, wherein the receiving apparatus identifies the first signal and the second signal based on an inclusion or exclusion of the pilot symbol.

6. A control method of a receiving apparatus, the control method comprising:

receiving a first signal and a second signal transmitted from a transmitting apparatus and a relay apparatus, respectively; and performing spatial time block code (STBC) decoding by using the received first and second signals, wherein the first signal comprises two successive symbols, wherein the second signal comprises the two successive symbols in a first data interval and comprises the two successive symbols in a second data interval, and wherein the first signal comprises a pilot symbol and the second signal is a signal from which the pilot symbol has been removed, wherein the signal from which the pilot symbol has been removed, the first signal received from the transmitting apparatus and a pilot signal obtained from the first signal are used in a channel estimation at the receiving apparatus, and wherein the STBC decoding is performed by the receiving apparatus by using two symbols received from the transmitting apparatus in the second data interval and two symbols received from the relay apparatus in the second data interval.

7. The control method of claim 6, further comprising identifying the first signal and the second signal based on inclusion or exclusion of the pilot symbol.

* * * * *